United States Patent
Tohyama (10) Patent No.: US 9,667,866 B2
(45) Date of Patent: May 30, 2017

(54) IMAGE PICKUP APPARATUS HAVING GPS FUNCTION AND INTERVAL PHOTOGRAPHING FUNCTION, AND METHOD OF CONTROLLING THE SAME

(71) Applicant: CANON KABUSHIKI KAISHA, Tokyo (JP)

(72) Inventor: Kei Tohyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/570,560

(22) Filed: Dec. 15, 2014

(65) Prior Publication Data

US 2015/0181121 A1    Jun. 25, 2015

(30) Foreign Application Priority Data

Dec. 19, 2013    (JP) .................................. 2013-262807

(51) Int. Cl.
*H04N 5/232* (2006.01)

(52) U.S. Cl.
CPC ......... *H04N 5/23245* (2013.01); *H04N 5/232* (2013.01); *H04N 5/23241* (2013.01)

(58) Field of Classification Search
CPC ........... H04N 5/23245; H04N 5/23296; H04N 5/232; H04N 5/23241; H04N 1/32101; H04N 1/00323; H04N 2201/3253; H04N 2201/3274; H04N 2201/3202; H04N 2101/00
USPC ...................................................... 348/222.1
See application file for complete search history.

(56) References Cited

U.S. PATENT DOCUMENTS

| | | | |
|---|---|---|---|
| 6,871,004 B1 * | 3/2005 | Bando | ..................... G01C 21/20 342/357.52 |
| 6,995,792 B1 | 2/2006 | Ogura | |
| 8,588,870 B1 * | 11/2013 | Vargantwar | ....... H04M 1/72572 455/127.1 |

(Continued)

FOREIGN PATENT DOCUMENTS

| | | |
|---|---|---|
| JP | 2001-257920 A | 9/2001 |
| JP | 2007-295034 A | 11/2007 |

OTHER PUBLICATIONS

Extended European Search Report issued in EP14198519.2, mailed May 7, 2015.

*Primary Examiner* — Pritham Prabhakher
(74) *Attorney, Agent, or Firm* — Rossi, Kimms & McDowell LLP (57) ABSTRACT

An image pickup apparatus reduced in wasteful electric power consumption due to execution of a GPS function and capable of adding the newest position information measured by the GPS function to an image photographed by interval photographing. An image pickup section has a plurality of image pickup modes including an interval mode for performing image pickup at photographing intervals of interval photographing. A GPS module acquires position information indicative of a position of the image pickup apparatus at GPS positioning intervals. The GPS positioning interval is set according to a user's operation. In a case where the image pickup section is set to the interval mode, GPS positioning interval is changed from the interval set according to a user's operation to an interval synchronized with the photographing interval of interval photographing.

10 Claims, 9 Drawing Sheets

(56) References Cited

U.S. PATENT DOCUMENTS

| | | | |
|---|---|---|---|
| 8,823,805 B2* | 9/2014 | Takahashi | H04N 5/232 348/169 |
| 8,982,240 B2* | 3/2015 | Akiyoshi | H04N 5/232 342/357.74 |
| 2007/0263981 A1* | 11/2007 | Ueno | G01S 19/34 386/291 |
| 2008/0094499 A1 | 4/2008 | Ueno et al. | |
| 2009/0033768 A1* | 2/2009 | Toyoda | H04N 1/32128 348/231.3 |
| 2009/0251558 A1 | 10/2009 | Park | |
| 2010/0026382 A1* | 2/2010 | Higaki | G01S 19/34 327/544 |
| 2011/0085054 A1* | 4/2011 | Choi | G06F 1/3203 348/231.3 |
| 2011/0164148 A1* | 7/2011 | Akiyoshi | H04N 5/232 348/231.99 |
| 2011/0261227 A1* | 10/2011 | Higaki | G03B 17/24 348/231.5 |
| 2012/0200715 A1 | 8/2012 | Takahashi | |
| 2013/0147984 A1 | 6/2013 | Matsui | |
| 2013/0314279 A1* | 11/2013 | Shen | G01S 19/34 342/357.74 |

* cited by examiner

FIG. 11

IMAGE PICKUP APPARATUS HAVING GPS FUNCTION AND INTERVAL PHOTOGRAPHING FUNCTION, AND METHOD OF CONTROLLING THE SAME

BACKGROUND OF THE INVENTION

Field of the Invention

The present invention relates to an image pickup apparatus having a GPS function and an interval photographing function, and a method of controlling the same, and more particularly to a GPS control technique and azimuth measurement used in interval photographing for performing photographing at predetermined intervals.

Description of the Related Art

In an image pickup apparatus having a global positioning system (GPS) function and an interval photographing function of performing photographing at predetermined intervals, in general, positioning by the GPS function and interval photographing are asynchronously set. For example, Japanese Patent Laid-Open Publication No. 2007-295034 discloses a technique for starting the GPS function by detecting that photographing is to be performed outdoors based on a distance to an object and brightness of the object. Further, Japanese Patent Laid-Open Publication No. 2001-257920 describing a camera system including a GPS receiver and an azimuth meter discloses a technique for automatically performing photographing when a spot set beforehand is reached. Here, with reference to FIG. 10, a description will be given of a GPS positioning interval and a photographing interval of interval photographing, and electric current consumption of the image pickup apparatus caused by GPS positioning and interval photographing, in the image pickup apparatus having the GPS function and the interval photographing function.

Figure 10:
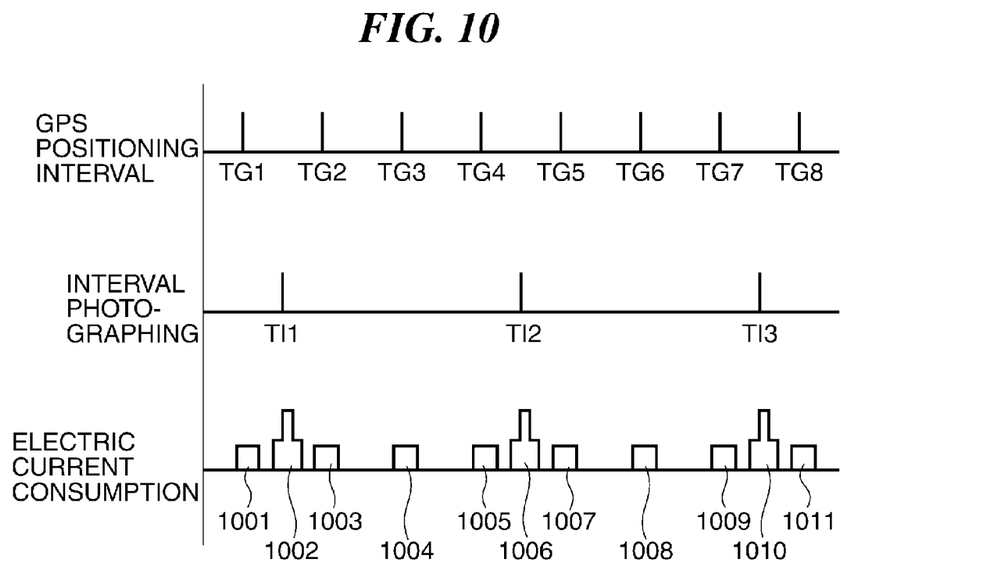
FIG. 10 is a timing diagram showing the GPS positioning intervals, the photographing intervals of interval photographing, and the electric current consumption, in the related art.
Figure 11:
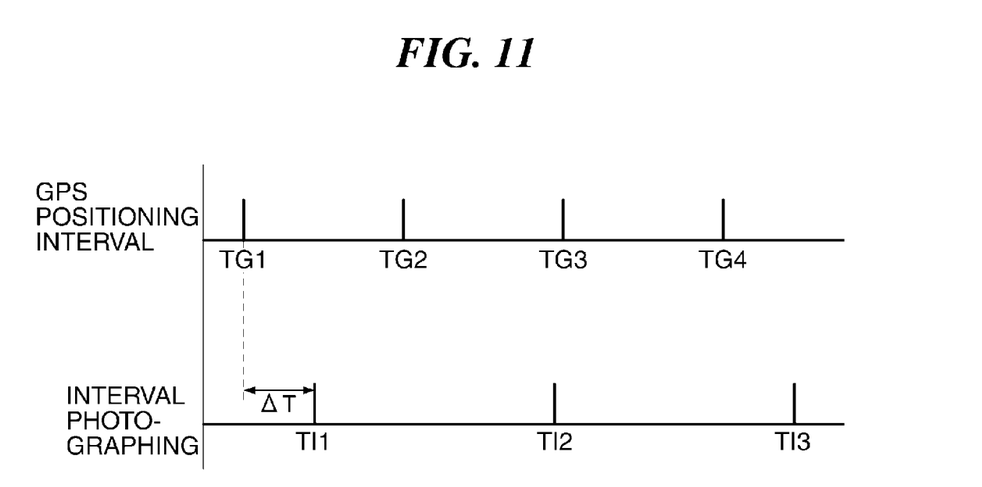
FIG. 11 is a timing diagram showing the GPS positioning intervals and the photographing intervals of interval photographing, in the related art.

Reference numerals TG1, TG2, . . . , TG8 in FIG. 10 each denote a timing of positioning performed by the GPS. Reference numerals T11, T12, and T13 in FIG. 10 each denote a photographing timing of interval photographing. Reference numeral 1001 in FIG. 10 denotes an electric current consumption amount detected when GPS positioning is performed at TG1. Similarly, reference numerals 1003 to 1005, 1007 to 1009, and 1011 denote electric current consumption amounts detected when GPS positioning is performed at TG2, TG3, . . . , TG8, respectively. Further, reference numeral 1002 denotes an electric current consumption amount detected when interval photographing is performed at T11, and reference numerals 1006 and 1010 denote electric current consumption amounts detected when interval photographing is performed at T12 and T13, respectively.

As shown in FIG. 10, since the interval of positioning by the GPS and the photographing interval of interval photographing are asynchronously set, for example, results of positioning performed by the GPS are not reflected on photographing. Therefore, there is a problem that electric power is wastefully consumed e.g. at the timings 1003 and 1004 in FIG. 10.

Further, an increase in the difference (ΔT) between the timing (TG1) of positioning performed by the GPS and the timing (TI1) of interval photographing causes a problem that the newest position information is not added to an image.

SUMMARY OF THE INVENTION

The present invention provides a technique for controlling an image pickup apparatus that is capable of reducing wasteful electric power consumption due to execution of a GPS function which is asynchronous to interval photographing, and adding the newest position information measured by the GPS function to an image photographed by interval photographing.

In a first aspect of the present invention, there is provided an image pickup apparatus comprising an image pickup unit configured to have a plurality of image pickup modes including an interval mode for performing image pickup in a case where a first time period elapses, a position acquisition unit configured to acquire position information indicative of a position of the image pickup apparatus in a case where a second time period elapses, and a setting unit configured to set the second time period according to a user's operation, wherein in a case where the image pickup unit is set to the interval mode, the setting unit changes the second time period from a time period set according to a user's operation to a time period determined based on the first time period.

In a second aspect of the present invention, there is provided an image pickup apparatus comprising an image pickup unit configured to have a plurality of image pickup modes including an interval mode for performing image pickup at a timing according to a first repetition period, a position acquisition unit configured to acquire position information indicative of a position of the image pickup apparatus at a timing according to a second repetition period, and a control unit configured to control, in a case where the interval mode is enabled, the position acquisition unit such that a phase of timing in which the image pickup unit performs image pickup in the interval mode and a phase of timing in which the position acquisition unit acquires position information satisfy a predetermined relationship.

In a third aspect of the present invention, there is provided a method of controlling an image pickup apparatus including an image pickup unit having a plurality of image pickup modes including an interval mode for performing image pickup in a case where a first time period elapses, comprising acquiring position information indicative of a position of the image pickup apparatus in a case where a second time period elapses, and setting the second time period according to a user's operation, wherein in a case where the image pickup unit is set to the interval mode, said setting includes changing the second time period from a time period set according to a user's operation to a time period determined based on the first time period.

In a fourth aspect of the present invention, there is provided a method of controlling an image pickup apparatus including an image pickup unit having a plurality of image pickup modes including an interval mode for performing image pickup at a timing according to a first repetition period, comprising acquiring position information indicative of a position of the image pickup apparatus at a timing according to a second repetition period, and controlling, in a case where the interval mode is enabled, said acquiring the position information such that a phase of timing in which the image pickup unit performs image pickup in the interval mode and a phase of timing in which the position information is acquired satisfy a predetermined relationship.

According to the present invention, it is possible to reduce wasteful electric power consumption due to execution of the GPS function which is asynchronous to interval photographing, and add the newest position information measured by the GPS function to an image photographed by interval photographing.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
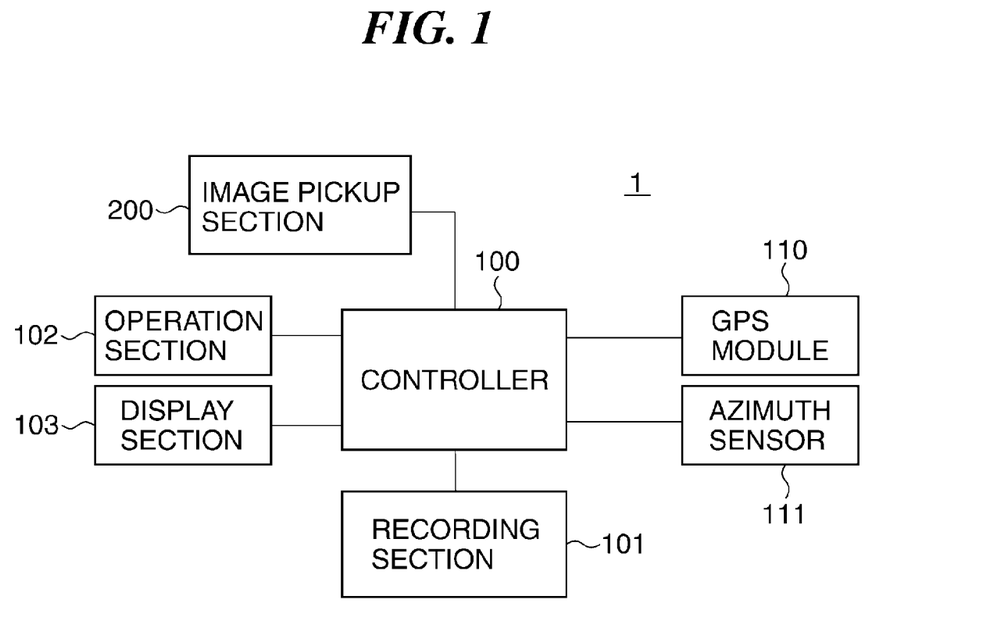
FIG. 1 is a schematic block diagram of an image pickup apparatus according to a first embodiment of the present invention.

FIG. 1 is a schematic block diagram of an image pickup apparatus according to a first embodiment of the present invention.

Referring to FIG. 1, the image pickup apparatus, denoted by reference numeral 1, is a camera having a GPS function and an interval photographing function, and is configured as described below.

An image pickup section 200 includes an optical lens, a CMOS sensor, a digital image processor, and so forth, none of which are shown, and converts an analog signal input through the optical lens to digital data to thereby acquire a photographed image. A recording section 101 is a memory for storing data of an image photographed by the image pickup section 200. An operation section 102 is comprised of buttons, a cross key, a tough panel, and so forth, and receives an instruction provided by a user's operation. Operation information input from the operation section 102 is transmitted to a controller 100. Further, the operation section 102 is configured to be capable of setting photographing intervals of interval photographing, intervals of positioning and azimuth measurement performed by the GPS and an azimuth sensor, respectively, and so forth. A display section 103 is implemented by e.g. a liquid crystal panel or an organic EL panel, and displays various information, such as an operation screen and a photographed image, based on an instruction from the controller 100.

Connected to the controller 100 are a GPS module 110 which is a position acquisition unit, and the azimuth sensor, denoted by reference numeral 111, whereby positioning information measured by the GPS module 110 and azimuth information measured by the azimuth sensor 111 are input to the controller 100. Further, the controller 100, which is connected to the above-mentioned components, performs various controls, including the control of image pickup and display operations performed by the image pickup section 200, the control of the timing of interval photographing, and the control of the timing of positioning performed by the GPS.

Next, a description will be given of an interval photographing control process performed by the image pickup apparatus 1 having the GPS function, shown in FIG. 1, with reference to FIG. 2.

Figure 2:
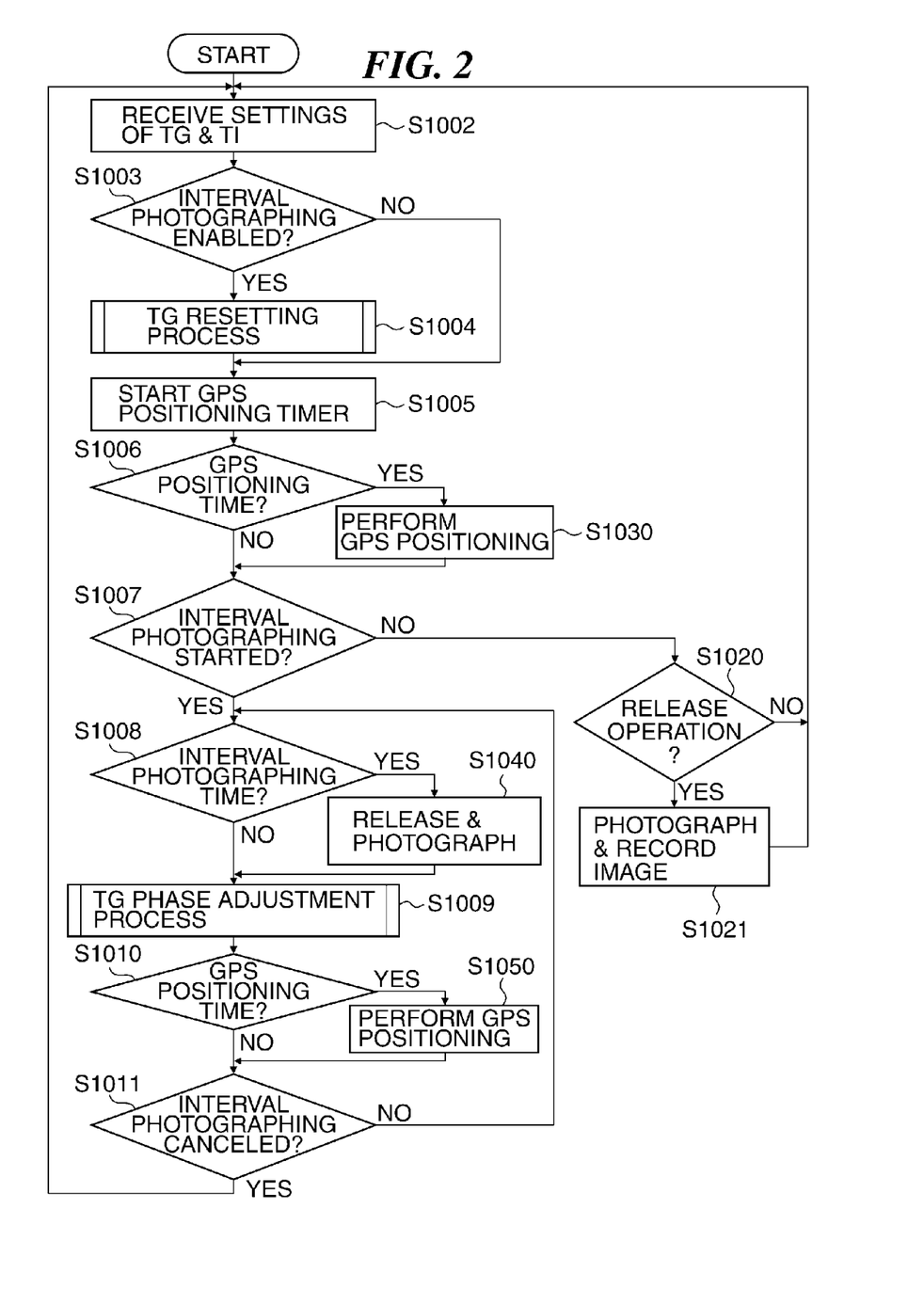
FIG. 2 is a flowchart of an interval photographing control process performed by the image pickup apparatus according to the first embodiment.

FIG. 2 is a flowchart of the interval photographing control process performed by the image pickup apparatus 1 according to the first embodiment. The present photographing control process is realized by the controller 100 which reads out a program stored in a nonvolatile memory, not shown, loads the read program into a RAM, not shown, and executes the program. Processes, described hereinafter, represented by other flowcharts are also realized in the similar manner. Further, the present photographing control process is started when the image pickup apparatus 1 is shifted to an interval photographing mode according to a user's operation.

Referring to FIG. 2, in a step S1002, the controller 100 receives the settings of the interval (TG) of positioning performed by the GPS module 110, the photographing interval (TI) of interval photographing, and the number of times of execution of interval photographing. Note that the controller 100 may be configured to also receive the setting of the intervals of measurement performed by the azimuth sensor 111, and thereby record an image including the azimuth information output from the azimuth sensor 111 when photographing the image, described hereinafter, so as to control the intervals of measurement performed by the azimuth sensor 111 and reduce power consumption due to the azimuth measurement. That is, the position acquisition unit of the present invention may include the function of an azimuth detection unit realized by the azimuth sensor.

Next, in a step S1003, the controller 100 determines whether or not interval photographing of which the photographing interval (TI) is set on the operation section 102 is set enabled in the enable/disable setting which is separately set in advance. If it is determined that interval photographing is set enabled, the process proceeds to a step S1004, whereas if not, the process proceeds to a step S1005.

In the step S1004, since both positioning performed by the GPS module 110 and interval photographing are simultaneously enabled, the controller 100 performs a TG resetting process for resetting the GPS positioning interval (TG). The TG resetting process in the step S1004 will be described in detail hereinafter.

In the step S1005, the controller 100 starts a GPS positioning interval timer incorporated in the controller 100 based on the GPS positioning intervals (TG) reset in the step S1004.

In a step S1006, the controller 100 determines whether or not the counted time has reached a set GPS positioning time, and if the counted time has reached the set GPS positioning time, the process proceeds to a step S1030, and whereas if not, the process proceeds to a step S1007.

In the step S1030, the controller 100 performs positioning by the GPS module 110, and then proceeds to the step S1007. A time period required for performing GPS positioning at this time is stored in the recording section 101.

In the step S1007, the controller 100 determines whether or not an operation for starting interval photographing has been performed on the operation section 102. If it is determined that the interval photographing-starting operation has been performed, the controller 100 starts a timer incorporated in the controller 100, for counting the photographing interval of interval photographing, and proceeds to a step S1008, whereas if not, the process proceeds to a step S1020.

In the step S1020, the controller 100 determines whether or not a release operation has been performed on the operation section 102. If it is determined that the release operation has been performed, the process proceeds to a step S1021, whereas if not, the process returns to the step S1002.

In the step S1021, the controller 100 photographs an object using the image pickup section 200, and records the photographed image including the positioning information output from the GPS module 110, in the recording section 101. Then, the process returns to the step S1002.

In the step S1008, the controller 100 determines whether or not time counted by the timer for counting the photographing interval of interval photographing, started in the step S1007, has reached an interval photographing time (the photographing interval (TI) has elapsed). If it is determined that the counted time has reached the interval photographing time, the process proceeds to a step S1040, whereas if not, the process proceeds to a step S1009.

In the step S1040, the controller 100 photographs an object using the image pickup section 200, and records the photographed image including the positioning information output from the GPS module 110, in the recording section 101. Further, the controller 100 updates the number of times of execution of interval photographing.

In the step S1009, the controller 100 performs a TG phase adjustment process for setting a phase adjusting positioning interval so as to synchronize the timing of positioning performed by the GPS module 110 and the photographing timing of interval photographing, and then proceeds to a step S1010. The TG phase adjustment process in the step S1009 will be described in detail hereinafter.

In the step S1010, the controller 100 determines whether or not the counted time has reached the GPS positioning time, and if it is determined that the counted time has reached the GPS positioning time, the process proceeds to a step S1050, whereas if not, the process proceeds to a step S1011.

In the step S1050, the controller 100 performs positioning by the GPS module 110, and then proceeds to the step S1011.

In the step S1011, the controller 100 determines whether or not interval photographing is canceled on the operation section 102, or if the number of times of execution of interval photographing has reached the set number of times. If interval photographing is canceled, or if the number of times of execution of interval photographing has reached the set number of times, the process returns to the step S1002, whereas if not, the process returns to the step S1008.

Next, a description will be given of the TG resetting process performed in the step S1004 in FIG. 2, for resetting the interval (TG) of positioning performed by the GPS module 110, with reference to FIG. 3.

Figure 3:
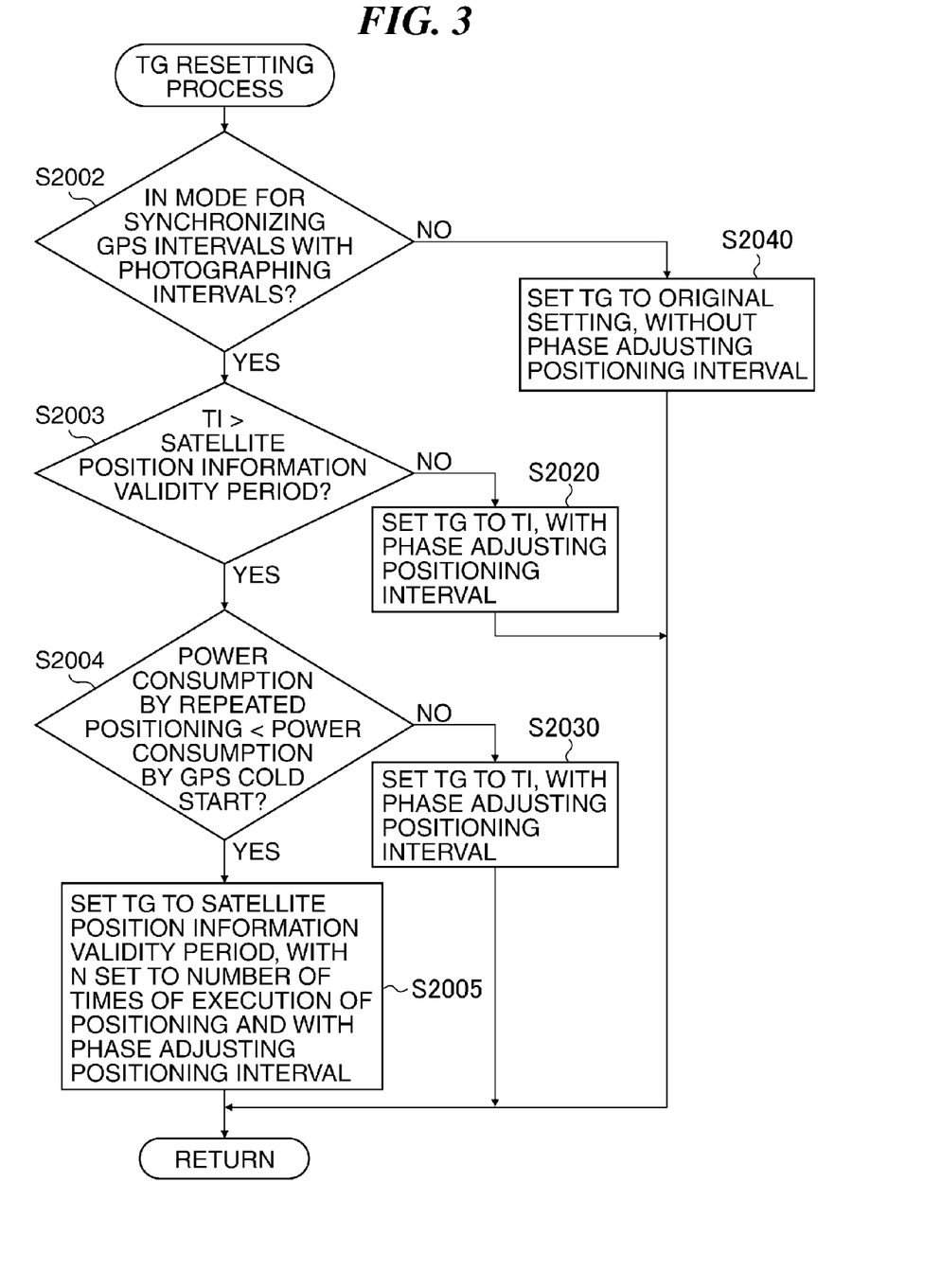
FIG. 3 is a flowchart of a TG resetting process performed in a step in FIG. 2, for resetting an interval of positioning performed by a GPS module.

FIG. 3 is a flowchart of the TG resetting process performed in the step S1004 in FIG. 2, for resetting the interval (TG) of positioning performed by the GPS module 110.

In a step S2002, the controller 100 determines whether or not the current mode is a mode for synchronizing the intervals of positioning performed by the GPS module 110 and the photographing intervals of interval photographing. If it is determined that the current mode is the mode for synchronizing the GPS positioning intervals and the photographing intervals, the process proceeds to a step S2003, whereas if not, the process proceeds to a step S2040.

Note that in a case where the current mode is a mode for recording results of GPS positioning in the recording section 101 at fixed intervals, the priority is given to GPS positioning performed at the positioning intervals (TG) set in the step S1002 in FIG. 2, and hence the process proceeds to the step S2040. The mode for recording results of GPS positioning at fixed intervals in the recording section 101, mentioned here, is a so-called logging mode for performing the function of generating a user's movement track. The image pickup apparatus 1 in the present embodiment has the function of generating a user's movement track using the GPS module 110 (so-called logging function). When the logging function is enabled, the GPS module 110 records position information and date-and-time information as a set of information whenever a predetermined time elapses, to thereby generate a log file. The user can set an interval of recording the position information during the use of the logging function of the GPS module 110 e.g. by menu operation.

Incidentally, when the logging function is enabled, as described above, the controller 100 gives priority to positioning, and does not execute the operation for synchronizing the intervals of positioning with the photographing intervals of interval photographing. This is because, when a user uses the logging function, the user may desire to record the position information indicative of the movement track also during the photographing intervals of interval photographing.

In the step S2040, the process returns without changing the GPS positioning interval (TG) set in the step S1002 in FIG. 2. Further, the phase adjusting positioning interval, described hereinafter, is not set, either.

Figure 5:
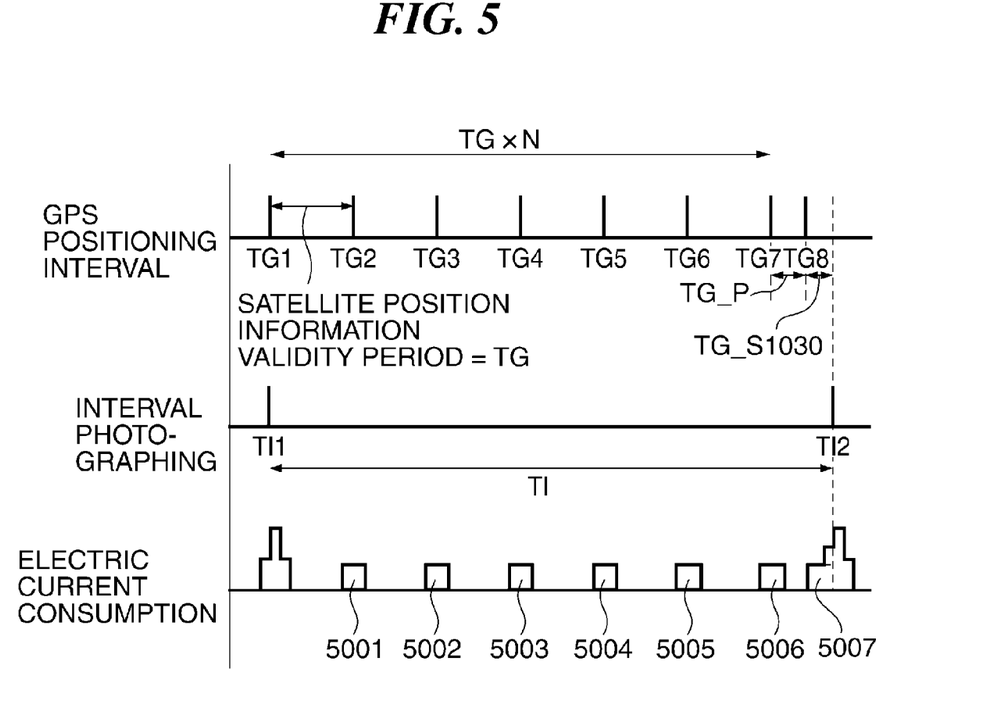
FIG. 5 is a timing diagram showing GPS positioning intervals, photographing intervals of interval photographing, and electric current consumption, in a case where a validity period of GPS satellite position information expires during the photographing interval of interval photographing.

In the step S2003, the controller 100 determines whether or not the photographing interval (TI) of interval photographing set in the step S1002 in FIG. 2 is longer than a validity period of GPS satellite position information. The GPS satellite position information generally has two types (almanac and ephemeris) of a validity period, and an almanac validity period (validity period of almanac data) is approximately one week, and an ephemeris validity period (validity period of ephemeris data) is approximately one hour and a half to four hours. In a case where the controller 100 determines that the set photographing interval (TI) of interval photographing is longer than the validity period of the GPS satellite position information, the process proceeds to a step S2004, whereas if not, the process proceeds to a step S2020. That is, in a case where the validity period of GPS satellite position information expires during the photographing interval (TI) of interval photographing, as shown in FIG. 5 which is a timing diagram showing GPS positioning intervals, photographing intervals of interval photographing, and electric current consumption, if the validity period of the GPS satellite position information expires during the photographing interval (TI) of interval photographing, the process proceeds to the step S2004.

Figure 7:
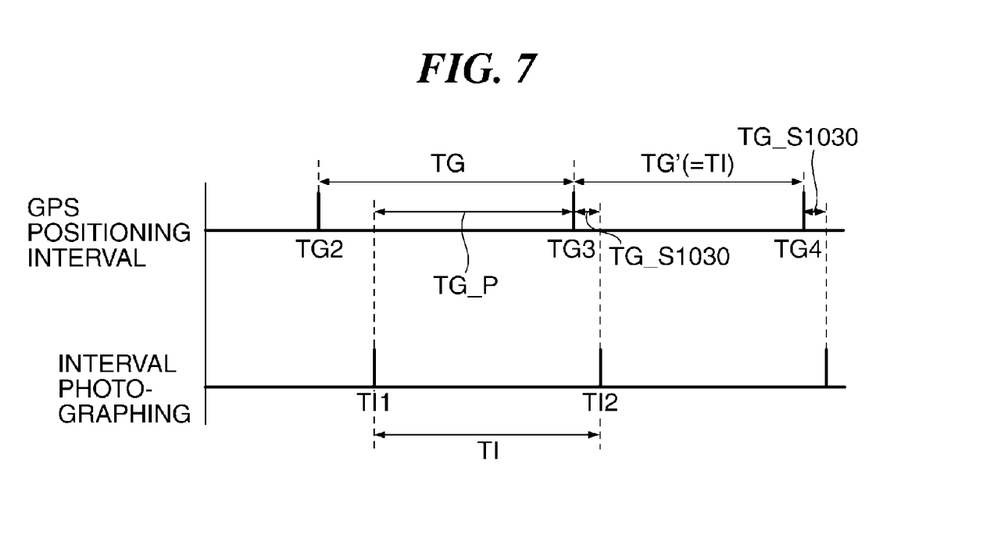
FIG. 7 is a timing diagram showing the GPS positioning intervals and the photographing intervals of interval photographing, in a case where the GPS positioning interval is changed by the TG resetting process in FIG. 3.

In the step S2020, the controller 100 sets the interval (TG) of positioning performed by the GPS module 110 to the photographing interval (TI) of interval photographing, and sets the phase adjusting positioning interval (TG_P) as expressed by the following equation (1), whereafter the process returns. More specifically, if the set photographing interval (TI) is not longer than the validity period of the GPS satellite position information, the controller 100 changes the GPS positioning interval TG to TG' as shown in FIG. 7 which is a timing diagram showing the GPS positioning intervals and the photographing intervals of interval photographing, in a case where the GPS positioning interval is changed by the TG resetting process in FIG. 3, whereby the GPS positioning interval is caused to be synchronized with the photographing interval of interval photographing. Therefore, the timings become as shown in FIG. 7. In this case, the phase adjusting positioning interval (TG_P) is calculated by the following equation (1):

phase adjusting positioning interval (TG_P)=TI–time period (TG_S1030) required for performing GPS positioning, which is stored in the step 1030 ... (1)

From the above, as shown in FIG. 7, after the timing TI1 (start of interval photographing), the interval of positioning performed by the GPS module 110 is changed from TG set in the step S1002 in FIG. 2 to TG' (=T1) and the positioning to be performed next is controlled such that it is completed immediately before performing the interval photographing.

Figure 6:
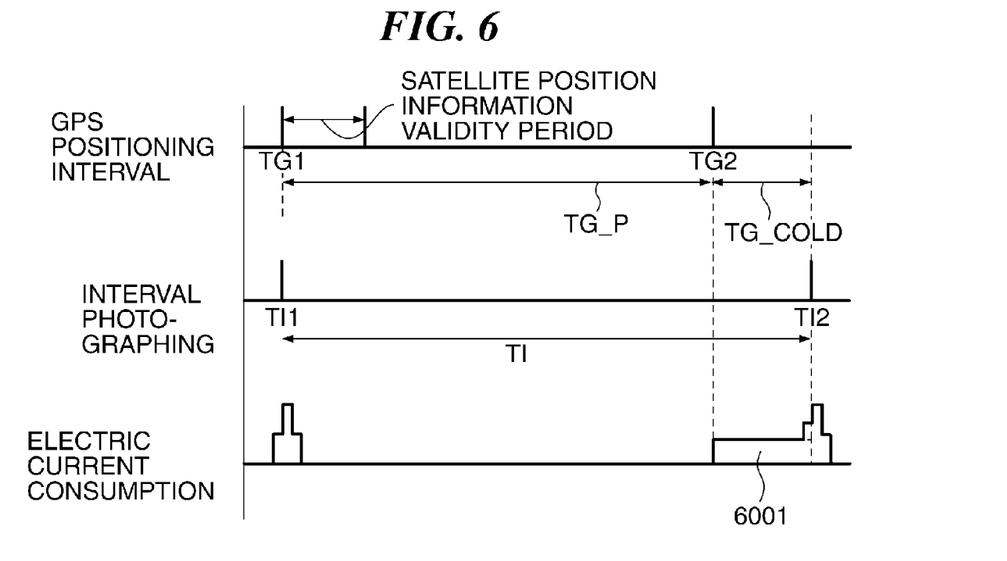
FIG. 6 is a timing diagram showing the GPS positioning intervals, the photographing intervals of interval photographing, and the electric current consumption, in a case where the set photographing interval of interval photographing is longer than the validity period of the GPS satellite position information.

In the step S2004, the controller 100 compares the sum of power consumption (sum of power consumptions 5001 to 5007 appearing in FIG. 5) in a case where the GPS module 110 performs positioning N times for each validity period of the GPS satellite position information and performs positioning at a time point TG_S1030 earlier than the time point of execution of interval photographing, within the photographing interval (TI) of interval photographing and then the interval photographing is performed in a manner synchronized therewith, and the power consumption (power consumption 6001 in FIG. 6) in a case where the GPS module 110 performs positioning after the GPS is cold-started immediately before photographing within the TI period (positioning performed from a state in which the satellite position information is invalid) and the interval photographing is performed in a manner synchronized therewith, as shown in FIG. 6. Then, if the power consumption from the cold start is larger than the sum of power consumptions, the process proceeds to a step S2005, whereas if the power consumption from the cold start is not larger than the sum of power consumptions, the process proceeds to a step S2030. The number of times N of execution of positioning is set based on the definite satellite position information validity period and photographing interval (TI), such that the following expression (2) is satisfied:

satellite position information validity period×N+ TG_S1030≤TI<satellite position information validity period×(N+1) ... (2)

Note that in a case where the GPS module 110 has acquired both of the above-mentioned almanac data and ephemeris data, the start of GPS is referred to as the hot start, and a time period required in this case for performing positioning is several seconds. In a case where the GPS module 110 acquires only almanac data, the GPS start is referred to as the warm start, and a time period required in this case for performing positioning is several seconds to several tens of seconds. In a case where the GPS module 110 has acquired neither almanac nor ephemeris information, the GPS start is referred to as the cold start, and a time period required in this case for performing positioning is several tens of seconds to several minutes.

In the step S2005, as shown in FIG. 5, the controller 100 sets the interval (TG) of positioning to be performed by the GPS module 110 to the satellite position information validity period. Further, the controller 100 sets the number of times N of execution of positioning described above in the step S2004, and sets the phase adjusting positioning interval (TG_P) for terminating GPS positioning immediately before interval photographing, which is calculated by the following equation (3), followed by returning. The timings are as shown in FIG. 5.

phase adjusting positioning interval (TG_P)=TI–TG× N–time period required for GPS positioning, which is stored in S1030 (TG_S1030) ... (3)

In the step S2030, the controller 100 sets the interval (TG) of positioning by the GPS module 110 to the photographing interval (TI) of interval photographing, and sets the phase adjusting positioning interval (TG_P), which is calculated by the following equation (4), followed by returning. The timings are as shown in FIG. 6. In other words, the controller 100 adjusts the GPS positioning start time such that it is made earlier by a time period required for the cold start:

phase adjusting positioning interval (TG_P)=TI– positioning time after cold start (TG_COLD) ... (4)

Next, a description will be given of the TG phase adjustment process for setting the phase adjusting positioning interval, which is performed in the step S1009 in FIG. 2, with reference to FIG. 4.

Figure 4:
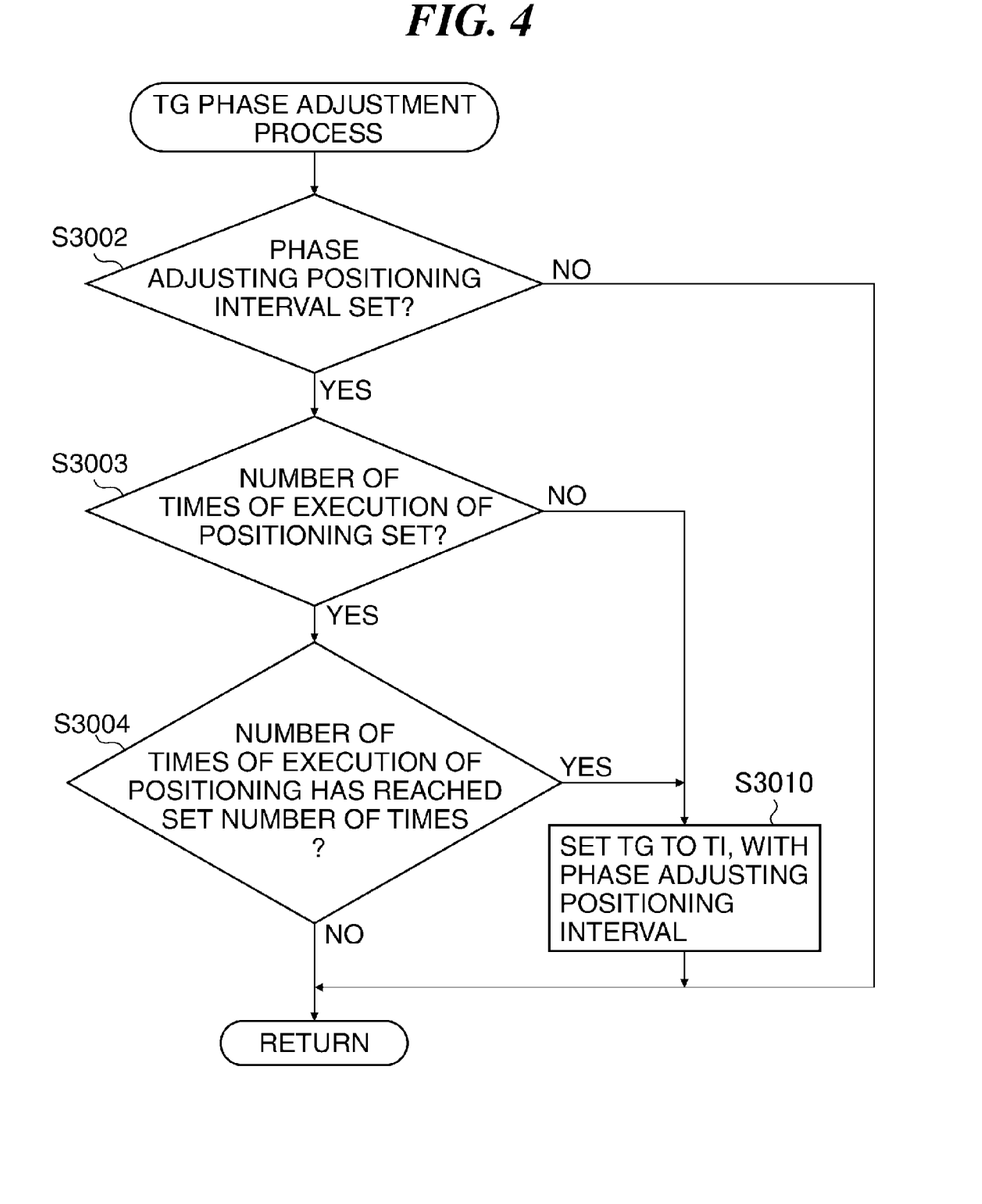
FIG. 4 is a flowchart of a TG phase adjustment process performed in a step in FIG. 2, for setting a phase adjusting positioning interval.

FIG. 4 is a flowchart of the TG phase adjustment process performed in the step S1009 in FIG. 2, for setting the phase adjusting positioning interval.

In a step S3002, the controller 100 determines whether or not the phase adjusting positioning interval (TG_P) is set in the TG resetting process in FIG. 3 for setting the GPS positioning interval (TG). If it is determined that the phase adjusting positioning interval (TG_P) is set, the process proceeds to a step S3003, whereas if not, the process returns.

In the step S3003, the controller 100 determines whether or not the number of times of execution of GPS positioning is set, and if it is determined that the number of times of execution of GPS positioning is set, the process proceeds to a step S3004, whereas if not, the process proceeds to a step S3010.

In the step S3004, the controller 100 determines whether or not the number of times of execution of GPS positioning in the step S1050 in FIG. 2 has reached the set number of times, and if the number of times of execution has reached the set number of times, the process proceeds to the step S3010, whereas if not, the process returns.

In the step S3010, the controller 100 sets the GPS positioning interval TG to the photographing interval TI, and also sets the phase adjusting positioning interval (TG_P) calculated in the TG resetting process in FIG. 3 for resetting the GPS positioning interval, followed by returning.

As described above, in a case where the set positioning interval and photographing interval, the satellite position information validity period, and power consumption caused by continuous GPS positioning satisfy predetermined conditions, the GPS positioning interval is changed to be synchronized with the interval of photographing performed by an interval photographing unit. As a consequence, in the case where the predetermined conditions are satisfied, interval photographing and GPS positioning are simultaneously performed, whereby it is possible to reduce wasteful electric power consumption due to GPS positioning asynchronous to interval photographing. Further, GPS positioning is finished immediately before interval photographing by setting the positioning interval adjusted with reference to the start of interval photographing, and hence it is possible to add the newest position information measured by the GPS to an image photographed by interval photographing. Although in the above description, GPS positioning during interval photographing has been described, the azimuth measurement may be performed by the azimuth sensor 111 at the same timing as the timing of GPS positioning to thereby control the intervals of measurement performed by the azimuth sensor 111 and power consumption due to the azimuth measurement. Further, only the intervals of measurement performed by the azimuth sensor 111 may be controlled in place of GPS positioning to thereby reduce power consumption due to the azimuth measurement performed by the azimuth sensor 111. That is, the position acquisition unit of the present invention may include the function of the azimuth detection unit realized by the azimuth sensor.

Next, a description will be given of an image pickup apparatus according to a second embodiment of the present invention with reference to FIG. 8. The same component elements as those described in the first embodiment are denoted by the same reference numerals, and description thereof is omitted. The following description will be given only of different points from the first embodiment.

Figure 8:
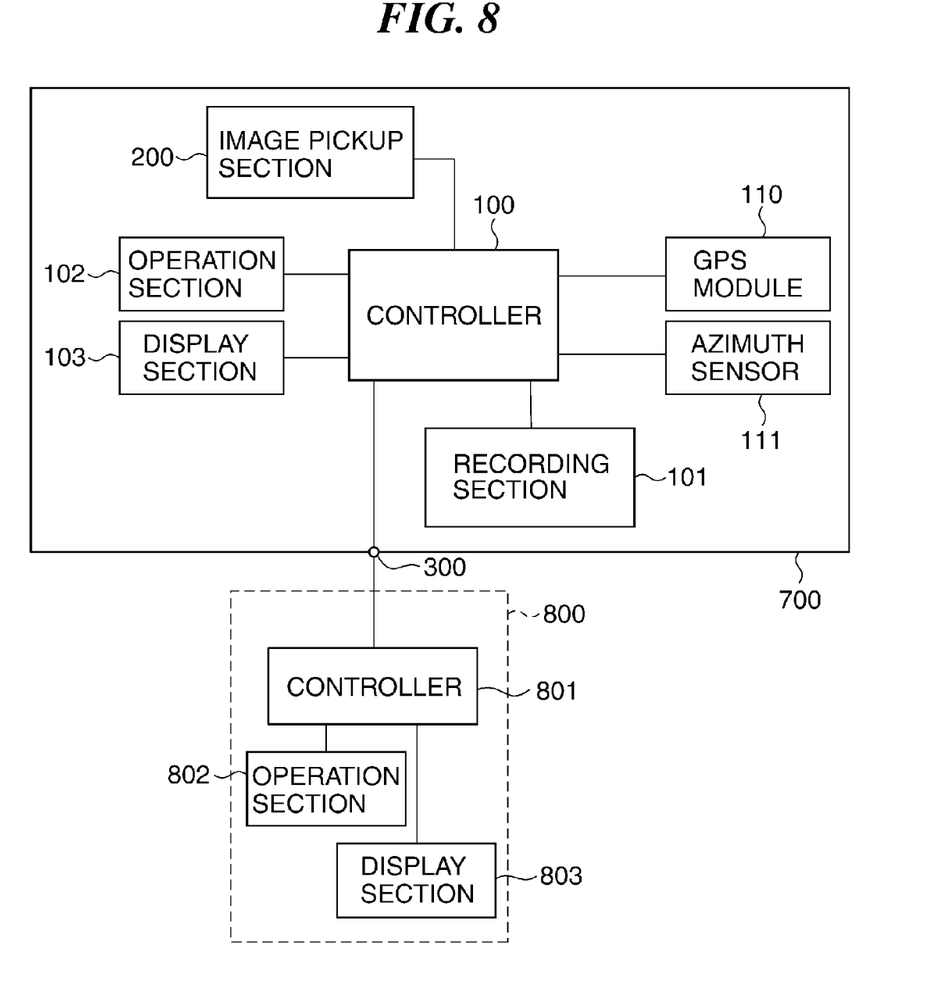
FIG. 8 is a schematic block diagram of an image pickup apparatus according to a second embodiment of the present invention.

FIG. 8 is a schematic block diagram of the image pickup apparatus according to the second embodiment.

Referring to FIG. 8, in the image pickup apparatus, denoted by reference numeral 700, the controller 100 is connected to an interval photographing accessory 800 via a connection terminal 300. The interval photographing accessory 800 is an accessory unit connected to the image pickup apparatus 700 to control interval photographing, and is configured to be removably attached to the image pickup apparatus 700. The interval photographing accessory 800 is comprised of a controller 801 which is different from the controller 100 included in the image pickup apparatus 700, an operation section 802, and a display section 803. The operation section 802 is comprised of buttons, etc., and receives an instruction input by a user's operation. The display section 803 is implemented by e.g. a liquid crystal panel, and displays various information, such as an operation screen.

In the interval photographing accessory 800, the interval (TI) set by the operation section 802 is input from the controller 801 to the controller 100 of the image pickup apparatus 700 via the connection terminal 300 as a release signal.

Next, a description will be given of an interval photographing control process with reference to FIG. 9, which is performed by the image pickup apparatus 700 to which the interval photographing accessory 800 is connected. Note that the same steps as those described in FIG. 2 are denoted by the same step numbers, with description thereof omitted, and only different points will be described.

Figure 9:
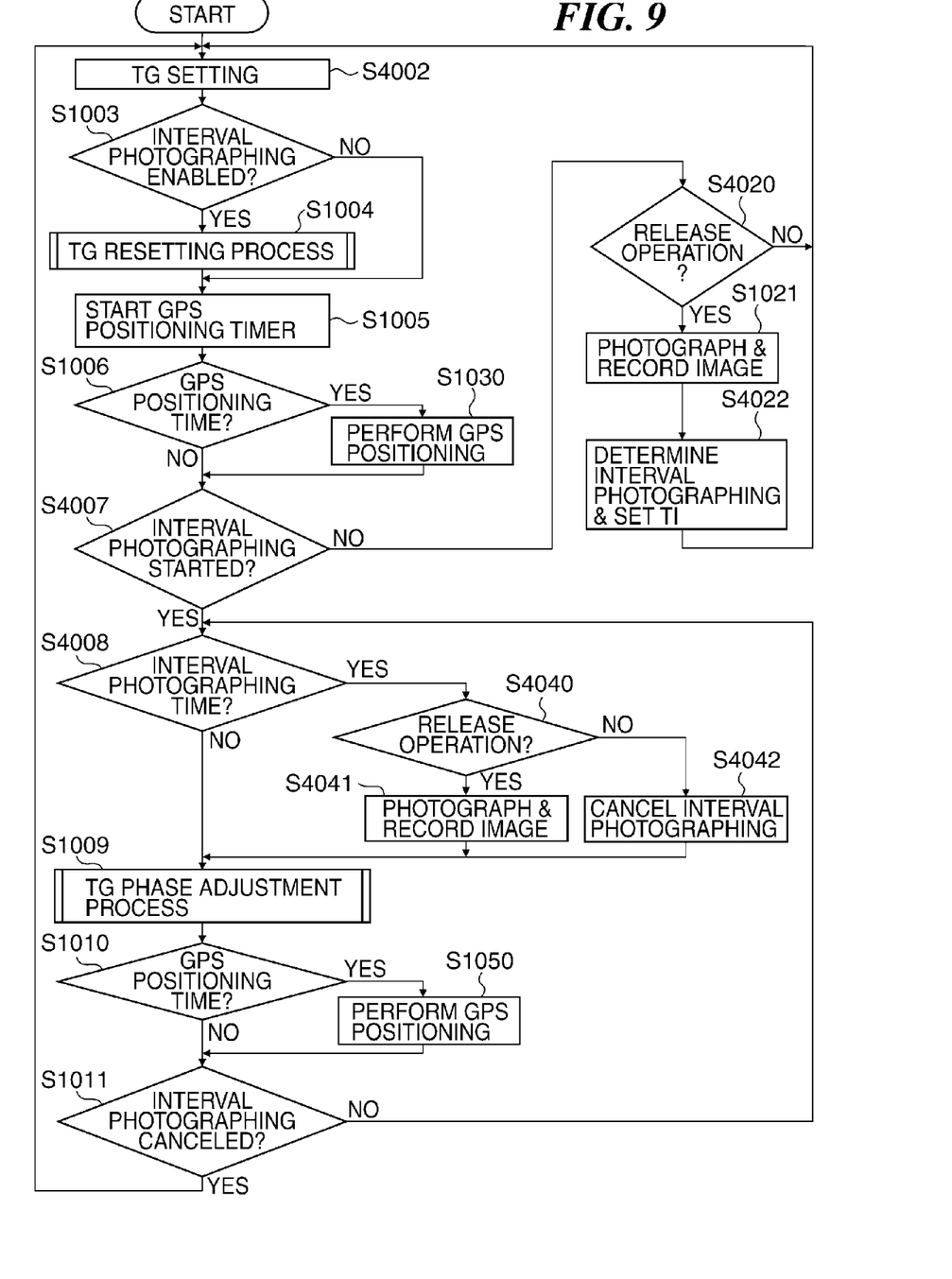
FIG. 9 is a flowchart of an interval photographing control process performed by the image pickup apparatus according to the second embodiment.

FIG. 9 is a flowchart of the interval photographing control process performed by the image pickup apparatus 700 according to the second embodiment. The present interval photographing control process is started when the mode is changed to the interval photographing mode according to a user's operation.

Referring to FIG. 9, in a step S4002, the controller 100 receives the setting of the interval of positioning to be performed by the GPS module 110 via the operation section 102. At this time, the setting of the photographing interval (TI) of interval photographing is received by the interval photographing accessory 800. Note that similarly to the first embodiment, the controller 100 may be configured to also receive the setting of the intervals of measurement performed by the azimuth sensor 111, and thereby record an image including the azimuth information output from the azimuth sensor 111 when photographing the image, referred to hereinafter, so as to control the intervals of measurement performed by the azimuth sensor 111 and reduce power consumption due to the azimuth measurement.

In a step S4007, the controller 100 determines whether or not interval photographing has been started, according to determination of whether or not it is during interval photographing in a step S4022, referred to hereinafter. If it is determined that interval photographing has been started, the process proceeds to a step S4008, whereas if not, the process proceeds to a step S4020.

In the step S4020, the controller 100 determines whether or not the release operation has been performed from one of the operation section 102 of the image pickup device 700 and the operation section 802 of the interval photographing accessory 800. If it is determined that the release operation has been performed, the process proceeds to the step S1021, whereas if not, the process returns to the step S4002.

In the step S4022, the controller 100 measures the intervals of the release operation started in the step S1021, and if the release operation is performed at fixed intervals, it is determined that it is during interval photographing, and sets the photographing interval (TI) of interval photographing. Further, the controller 100 starts the timer incorporated in the controller 100, for counting the photographing interval of interval photographing, and returns to the step S4002.

In the step S4008, the controller 100 determines whether or not the timer started in the step S4022 has reached the interval photographing time (the photographing interval (TI) has elapsed). If it is determined that the timer has reached the interval photographing time, the process proceeds to a step S4040, whereas if not, the process proceeds to the step S1009.

In the step S4040, the controller 100 determines whether or not the release operation has been performed from one of the operation section 102 of the image pickup device 700 and the operation section 802 of the interval photographing accessory 800. If it is determined that the release operation has been performed, the process proceeds to a step S4041, whereas if not, the process proceeds to a step S4042.

In the step S4041, similarly to the step S1021, the controller 100 photographs the object using the image pickup section 200, records the image including the positioning information output form the GPS module 110, in the recording section 101, and proceeds to the step S1009.

In the step S4042, since the release signal is not input from the interval photographing accessory 800 at a repetition period of the photographing interval TI, the controller 100 determines that interval photographing is terminated, and cancels interval photographing, and the process proceeds to the step S1009.

As described above, in the case where the release operation is performed at fixed intervals, whereupon it is determined that it is during interval photographing to perform interval photographing, if the predetermined conditions are satisfied, the GPS positioning interval is changed such that it is synchronized with the photographing interval of photographing performed by the interval photographing unit. This also applies to a case where the release operation is performed by the external accessory. As a consequence, similarly to the first embodiment, it is possible to reduce wasteful power consumption due to GPS positioning asynchronous to interval photographing. Further, GPS positioning is finished immediately before interval photographing by setting the positioning interval adjusted after the start of interval photographing and hence it is possible to add the newest position information measured by GPS to an image photographed by interval photographing. Note that similarly to the first embodiment, the azimuth measurement may be performed by the azimuth sensor 111 at the same timing as the timing of GPS positioning to thereby control the intervals of measurement performed by the azimuth sensor 111 and power consumption due to the azimuth measurement. Further, only the intervals of measurement performed by the azimuth sensor 111 may be controlled in place of GPS positioning to thereby reduce power consumption due to the azimuth measurement performed by the azimuth sensor 111.

In the description (particularly, the description of the step S2020), given with reference to FIG. 3, of the above-described embodiments, the GPS positioning interval is synchronized with the photographing interval of interval photographing in a case where the set photographing interval is not smaller than the set positioning interval. However, a scene is considered, which requires more accurate position information acquired in synchronism with the timing of interval photographing. To cope with this, the GPS positioning interval may be synchronized with the photographing interval of interval photographing even when the set photographing interval is smaller than the set positioning interval.

Further, although in the above-described embodiments, the description has been given of the example in which in the case where the positioning interval is changed according to the photographing interval of interval photographing, the positioning interval is changed such that one positioning operation is performed with respect to one photographing operation, the positioning interval may be changed, for example, in the following manner: half the time of the photographing interval is set as the positioning interval. The power saving effects can also be acquired by using this method. That is, a time which is longer than the original positioning interval and is acquired by equally dividing the photographing interval may be set as the positioning interval.

Further, in addition to the above-described embodiments, the release operation may be received even during interval photographing. More specifically, the release operation may be received even when the steps S1008 to S1011 and S1050 in FIG. 2 are being executed. Note that in the step S1040, since photographing processing is being executed, higher priority is set to processing which has been already executed. Further, when the release operation is received, the controller 100 may control image pickup to be performed separately from image pickup executed at each photographing interval of interval photographing while maintaining the interval photographing mode. Alternatively, when the release operation is received, the controller 100 may terminate the interval photographing mode, and shift the mode to the still image photographing mode to perform image pickup. This makes it possible to reduce possibility of missing a shutter chance. Further, the newest position information, which has been acquired, of all items of position information acquired at timings synchronized with the photographing interval of interval photographing, is added to the image which is acquired by the above-mentioned manner.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262807 filed Dec. 19, 2013, which is hereby incorporated by reference herein in its entirety.

What is claimed is:

1. An image pickup apparatus comprising:
a storage device; and
a processor configured to execute computer executable instructions recorded on the storage device, the computer executable instructions including instructions, that when executed by the processor, cause the image pickup apparatus to:
operate in a plurality of image pickup modes including an interval mode for performing image pickup in a case where a first time period elapses;
acquire position information indicative of a position of the image pickup apparatus in a case where a second time period elapses;
set the second time period according to a user's operation;
determine whether the first time period is longer than a validity period of satellite position information for acquiring the position information;

synchronize the second time period and the first time period in a case where the first time period is equal to or shorter than the validity period of satellite position information;

determine, before the first time period elapses, whether power required for measuring performed each time when the second time period elapses is larger than power required for measuring performed from a cold start in a case where the first time period is longer than the validity period of satellite position information;

maintain the second time period unchanged in a case where the power required for the measuring performed each time when the second time period elapses is not larger than the power required for the measuring performed from the cold start; and synchronize the second time period and the first time period in a case where the power the power required for the measuring performed each time when the second time period elapses is larger than the power required for the measuring performed from the cold start.

2. The image pickup apparatus according to claim 1, wherein in a case where the interval mode is terminated, said image pickup apparatus is caused to stop acquisition of the position information.

3. The image pickup apparatus according to claim 1, wherein in a case where the interval mode is terminated, said image pickup apparatus is caused to change the second time period from the time period determined based on the first time period to the time period set according to a user's operation.

4. The image pickup apparatus according to claim 1, wherein the image pickup apparatus has a mode in which the priority is given to acquiring position information in the case where the second time period elapses, and in a case where the mode is set, the second time period is not changed to the time period determined based on the first time period.

5. The image pickup apparatus according to claim 1, wherein the computer executable instructions further include instructions, that when executed by the processor, cause the image pickup apparatus to record a plurality of acquired position information items and date-and-time information indicative of a date and time on which each position information is acquired, in a log file, and wherein in a case where the recording is enabled, the second time period is not changed to the time period determined based on the first time period.

6. The image pickup apparatus according to claim 1, wherein in a case where the second time period is longer than the first time period, the second time period is not changed from the time period set according to a user's operation to the time period determined based on the first time period.

7. The image pickup apparatus according to claim 1, wherein the computer executable instructions further include instructions, that when executed by the processor, cause the image pickup apparatus to record image data obtained by performing image pickup in a case where the first time period elapses, by associating acquired position information with the image data.

8. The image pickup apparatus according to claim 1, wherein the computer executable instructions further include instructions, that when executed by the processor, cause the image pickup apparatus to receive an image pickup instruction according to a user's operation, and wherein even in a case where said image pickup apparatus is set to operate in the interval mode, in response to receipt of an image pickup instruction, said image pickup apparatus is caused to perform image pickup separately from image pickup performed in a case where the first time period elapses.

9. The image pickup apparatus according to claim 1, wherein the computer executable instructions further include instructions, that when executed by the processor, cause the image pickup apparatus to receive an image pickup instruction according to a user's operation, and wherein in a case where the image pickup instruction is received, said image pickup apparatus is caused to terminate the interval mode and perform image pickup.

10. A method of controlling an image pickup apparatus including an image pickup device having a plurality of image pickup modes including an interval mode for performing image pickup in a case where a first time period elapses, comprising:

acquiring position information indicative of a position of the image pickup apparatus in a case where a second time period elapses;

setting the second time period according to a user's operation;

determining whether the first time period is longer than a validity period of satellite position information for acquiring the position information;

synchronizing the second time period and the first time period in a case where the first time period is equal to or shorter than the validity period of satellite position information;

determining, before the first time period elapses, whether power required for measuring performed each time when the second time period elapses is larger than power required for measuring performed from a cold start in a case where the first time period is longer than the validity period of satellite position information;

maintaining the second time period unchanged in a case where the power required for the measuring performed each time when the second time period elapses is not larger than the power required for the measuring performed from the cold start; and synchronizing the second time period and the first time period in a case where the power the power required for the measuring performed each time when the second time period elapses is larger than the power required for the measuring performed from the cold start.

* * * * *